United States Patent [19]

De Vries

[11] Patent Number: 5,779,028

[45] Date of Patent: Jul. 14, 1998

[54] BELT HAVING TRANSVERSE RIGIDITY

[75] Inventor: Hans De Vries, Drachten, Netherlands

[73] Assignee: Dunlop-Enerka B.V., Drachten, Netherlands

[21] Appl. No.: 700,495

[22] PCT Filed: Mar. 7, 1995

[86] PCT No.: PCT/NL95/00087

§ 371 Date: Aug. 30, 1996

§ 102(e) Date: Aug. 30, 1996

[87] PCT Pub. No.: WO95/24351

PCT Pub. Date: Sep. 14, 1995

[30] Foreign Application Priority Data

Mar. 7, 1994 [NL] Netherlands ............... 9400350

[51] Int. Cl.⁶ ........................................... B65G 15/34
[52] U.S. Cl. ........................................... 198/847
[58] Field of Search ............................... 198/847

[56] References Cited

U.S. PATENT DOCUMENTS

| | | | |
|---|---|---|---|
| 2,792,868 | 5/1957 | Benson | 198/847 X |
| 2,850,420 | 9/1958 | Hacker | 198/847 X |
| 3,900,627 | 8/1975 | Angioletti et al. | 198/847 X |
| 4,004,467 | 1/1977 | Kenney | 198/847 X |

FOREIGN PATENT DOCUMENTS

| | | | |
|---|---|---|---|
| 0273478 | 7/1988 | European Pat. Off. | 198/847 |
| 72246 | 3/1960 | France . | |
| 2 335 429 | 7/1977 | France . | |
| 2 532 190 | 1/1977 | Germany . | |
| 4209115 | 7/1992 | Japan | 198/847 |
| 0273677 | 9/1964 | Netherlands | 198/847 |
| 0346158 | 6/1960 | Switzerland | 198/847 |
| WO 81/01697 | 6/1981 | WIPO . | |

Primary Examiner—James R. Bidwell
Attorney, Agent, or Firm—Young & Thompson

[57] ABSTRACT

A belt with transverse rigidity is constructed so as to prevent the formation of cracks on the surface layer. Belt includes two pairs of sub-layers which provide transverse rigidity. The layers are staggered with respect to one another in order to allow the belt to be driven by a relatively small diameter drum.

7 Claims, 2 Drawing Sheets

BELT HAVING TRANSVERSE RIGIDITY

BACKGROUND OF THE INVENTION

1. Field of the Invention

The present invention relates to a belt having transverse rigidity.

2. Description of the Prior Art

A belt of this type having transverse rigidity is disclosed in European Patent 0 273 478. In the case of said belt, the layers providing transverse rigidity comprise a number of cables of, for example, four wires each having a diameter of 0.6 mm and a spacing of 2.5 mm, located some distance apart in the horizontal plane. Belts of this type having transverse rigidity are used, for example, as moving pavements in, for example, airports or exhibition areas. The layers providing transverse rigidity are made of a high modulus material, for example a material having a modulus greater than 50 Giga Pascal. Examples thereof are steel wire and aramide threads. This is in contrast to polyester filaments, nylon threads or other relatively weak materials. One example of a high modulus material is Fleximat®, which is marketed by the Bekeart Company. A significant advantage of belts of this type compared with aluminium constructions composed of a large number of parts is the lower maintenance and the lower noise level. A problem, which exists with all installations, is the diameter of the drum around which the belt, or the aluminium pallet system, has to be guided at the end. If this drum is relatively large, this means that the floor of a building in which an installation of this type has to be installed has to be raised or lowered in order to be able to accommodate the installation and the associated parts.

In this context a particular advantage of the belt system compared with the aluminium pallet system is the very small diameter of the drum which can be used.

Long-term trials with drums having an even smaller diameter have shown that no problems occur in the short term but in the long term the outer surfaces of the belt which are subjected to the greatest deformation stress display cracking. Although such cracking has no significant effect on the mechanical characteristics of the belt and the latter can still be used for many years without any problems, a psychological problem with regard to the reliability of the belt certainly arises when said belts are used for transporting people. The aim of the present invention is to prevent said cracking in a belt having transverse rigidity.

SUMMARY OF THE INVENTION

This aim is achieved in the case of a belt having transverse rigidity, described above.

The invention is based on the insight that initiation of the cracks does not occur at the surface but at the wires which form the layers having transverse rigidity. Once the cracks have been initiated there, they are propagated in the direction of the surface of the belt. On the basis of this insight, in contrast to what would appear to be obvious, no attempt has been made to take measures to maintain the surface of the belt undamaged for a longer period, but measures have been taken to prevent initiation of the crack at the cables or wires. If there is no initiation at the cables, the surface of the belt will likewise not crack, so that special measures at the surface are not necessary.

Once the insight had been gained that the cracks start at the cables, the following step was to take measures in order to reduce the tension at the location of the cables. An obvious solution would be simply to increase the distance between the steel cables. However, this gives rise to the problem that the transverse rigidity of the belt concerned is reduced. It would then be possible to use a larger number of wires per cable, but this gives rise to problems because the risk that the cables will work loose from the rubber during operation and come to the surface is appreciably increased. The solution proposed according to the invention, comprising the arranging of at least two layers of cables some distance apart, makes it possible to increase the spacing between the cables in each layer while still using the same amount of cable material in order to provide an adequate transverse rigidity.

It is pointed out that U.S. Pat. No. 2,850,420 discloses a belt which has a so-called 'breaker' layer, comprising two sub-layers some distance apart which provide transverse strength. Here, however, there is no question of high modulus material, and, therefore, a belt of this type is unsuitable for use for the transport of, for example, people because this belt will display appreciable sag. Moreover, this belt does not have a single layer providing longitudinal strength but a pack of layers, each of which is able to absorb part of a force acting in the longitudinal direction. Moreover, one of the sub-layers which provides transverse rigidity is arranged directly adjacent to such a layer absorbing longitudinal stresses.

Consequently, a belt of this type does not have the desired flexible characteristics necessary for its movement over a drum of relatively small diameter, which was precisely what gave rise to the problems on which the present invention is based.

It is also pointed out that French Patent 72246 discloses a conveyor belt in which a layer having transverse rigidity is present. Above this layer a textile layer is provided to prevent the belt from curling during hardening of the rubber material at fabrication of the belt. This textile material is, as indicated above, not a high modulus material. Consequently, cracking will still occur in the case of a belt of this type when the latter is subjected to load, as according to the invention.

As already indicated above, the consequences of the cracking are most pronounced at the top of the belt. Therefore, in this case a layer providing transverse rigidity and composed of at least two sub-layers is arranged at the top of the belt. In order also to prevent problems on the underside, the lowest layer providing transverse rigidity can likewise be composed of at least two sub-layers.

As in the cables used in the prior art, the wires of which the cables are composed can also consist of high modulus material in the case of the invention. The distance between the cables is preferably between 2.5 and 7.5 mm. As in the prior art the cables can comprise any number of wires. For optimum adhesion, preference is given to three wires.

The spacing between two adjacent sub-layers must, on the one hand, be sufficiently small to be able to maintain the concept of a "box construction" of the belt but, on the other hand, must be sufficiently large that the crack initiation, described above, in the cables is prevented. It has been found that these conditions can be met in an optimum manner if the spacing between the sub-layers is between 1 and 3 mm and preferably about 2 mm.

The layer providing longitudinal strength can, as is generally known, be arranged in any position between the two layers providing transverse rigidity. However, preference is given to arranging said layer approximately in the centre of the belt.

BRIEF DESCRIPTION OF THE DRAWINGS

The invention will be explained in more detail below with reference to an illustrative embodiment shown in the drawing. In the drawing.

DESCRIPTION OF THE PREFERRED EMBODIMENTS

Figure 1:
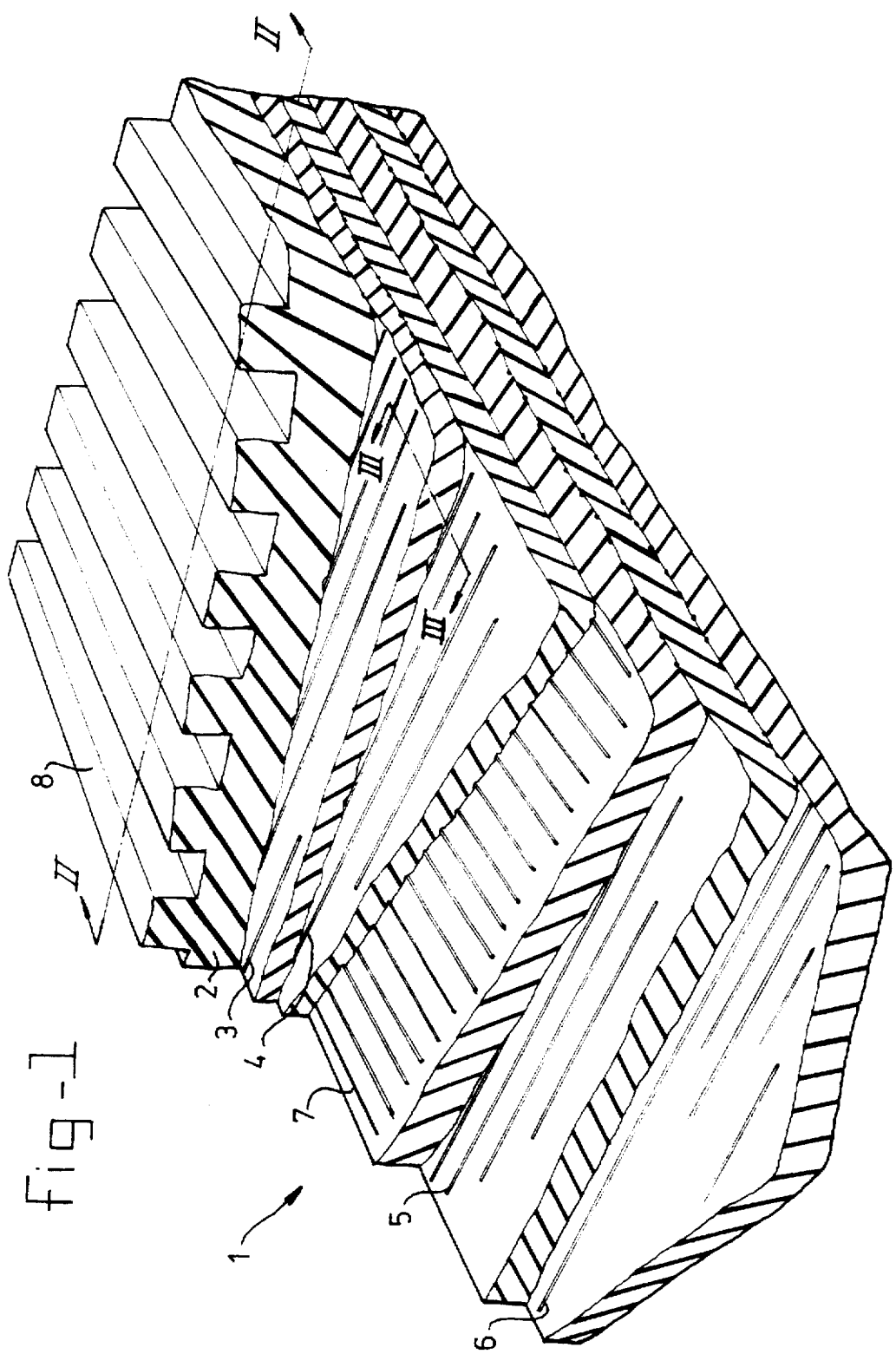
FIG. 1 shows a partially exposed perspective view of the belt according to the invention.

In FIG. 1 the belt according to the invention is indicated in its entirety by 1. As can also be seen from FIG. 2, said belt comprises a rubber support material 2, which extends over the entire height of the belt. At the top, said rubber material is constructed as a ribbed profile 8. The following layers are arranged in said rubber support, working from top to bottom:

two sub-layers 3 and 4, which together form the uppermost layer having transverse rigidity. In this illustrative embodiment, said sub-layers are approximately 2 mm apart. The distance between the uppermost part of the rubber profile 8 and layer 3 is about 8 mm. The distance between layers 4 and 5 is between 6 and 15 mm. The two sub-layers 5 and 6 form the bottommost layer having transverse rigidity. In this illustrative embodiment, said sub-layers are approximately 2 mm apart. On the underside, the belt is bound by 2 mm rubber. Consequently, the belt has a total thickness which is preferably between 20 and 35 mm.

Figure 3:
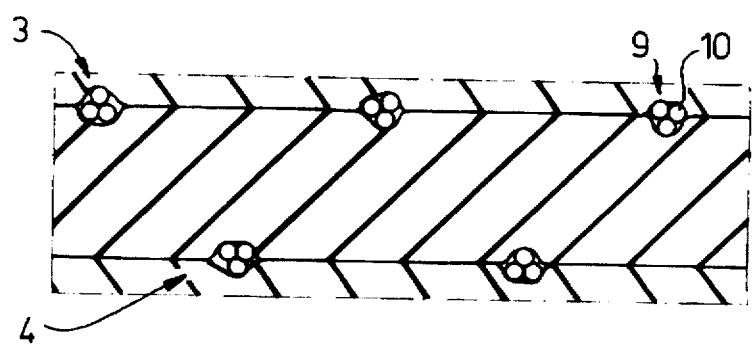
FIG. 3 shows, in detail, a longitudinal section along the line III—III of one of the layers providing transverse rigidity.

FIG. 3 shows a longitudinal section of a layer having transverse rigidity. It can be seen that said layer is composed of cables 9, which are located in the layers 3 and 4. The spacing of the cables 9 in a layer is between 2.5 and 7.5 mm and is preferably about 4 mm. Each cable 9 is preferably composed of three wires 10 of high modulus material. The diameter of each wire is about 0.6 mm.

The mechanical characteristics of a layer of this type which has transverse rigidity and is made up of two sub-layers can be compared with a conventional layer having transverse rigidity which is composed of a single layer containing cables having four wires 0.6 mm in diameter and a pitch of 2.5 mm. The amount of steel or other high modulus material incorporated in a layer of this type having transverse rigidity is the same as in the case of the layer having transverse rigidity according to the invention, and the strength is therefore the same. The invention is based on the insight that by increasing the spacing between the cables the damping and absorbing characteristics of the rubber material can be exploited to an optimum extent and crack initiation is prevented. In the case of the use of three wires, there is optimum adhesion between rubber and cable.

Figure 2:
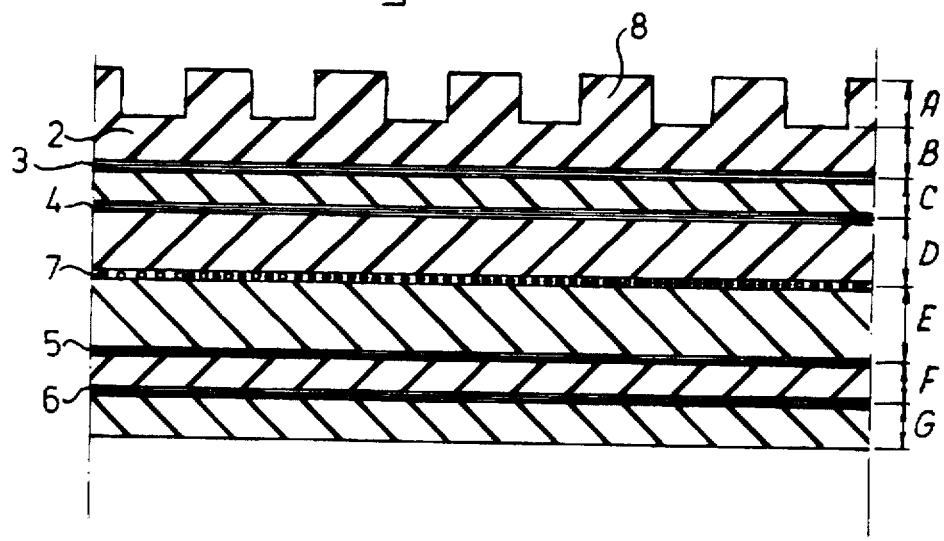
FIG. 2 shows a cross-section along the line II—II in FIG. 1.

With reference to FIG. 2, a preferred embodiment of the belt according to the invention will be described in more detail below.

Example:

In the case of a belt having a total thickness of 30 mm, the height of the ribs is 5.0 mm. This is indicated by A. The distance between layer 3 and the lower part of the longitudinal ribs is indicated by B and is 3.3 mm. With this embodiment, distance C between the two layers 3 and 4 is 2.2 mm, whilst layer 7, which provides the longitudinal strength, is located approximately in the centre of the belt depth, the height of longitudinal ribs 8 than no longer being taken into account.

With this embodiment, the distance D+E, i.e. the distance between the two closest layers providing transverse strength, is 14 mm. The distance between the layers 5 and 6, distance F, is 2.2 mm, whilst the distance G is 2.6 mm.

It can be seen from the above examples that the distance between the layers 4 and 5 makes up at least 25% of the total belt thickness (in which the height of the ribs 8 is not included).

Although the invention has been described above with reference to a preferred embodiment, it must be understood that numerous modifications can be made thereto without going beyond the scope of the present invention. For instance, it is possible to arrange the layer providing longitudinal strength in a different position, for example adjacent to the lowermost or uppermost layer providing transverse rigidity. Similarly, the cables can be composed of a number of wires other than three and each layer providing transverse rigidity can be composed of three or more sub-layers. All such modifications are considered to fall within the scope of the appended claims.

I claim:

1. Belt (1) comprising a rubber support (2) having layers (3–6) embedded in said support and composed of high modulus cables, one of said layers being disposed close to the top and one of said layers being disposed close to the bottom of the belt to extend essentially perpendicular with respect to the longitudinal axis of the belt over the substantially complete belt width to provide transverse rigidity and, between said layers, a single layer (7) extending essentially parallel with respect to the longitudinal axis of the belt to provide longitudinal strength of the belt, characterized in that at least the layer located close to the top of the belt, comprises at least two spaced apart sub-layers (3,4) the distance between said sub-layer being smaller than the distance from any of said sub-layers to the layer providing longitudinal strength.

2. Belt according to claim 1, wherein the top of the belt is provided with a ribbed profile (8).

3. Belt according to claim 1, wherein the layer provided and located close to the bottom comprises at least two sub-layers (5, 6) located a small distance apart.

4. Belt according to claim 1, wherein each cable in each sub-layer comprises approximately three wires (10) of high modulus material.

5. Belt according to claim 1, wherein each sub-layer is composed of a number of cables located some distance apart, the spacing between said cables within said sub-layer being between 2.5 and 7.5 mm.

6. Belt according to claim 1, wherein the distance between two adjacent sub-layers is between 1 and 3 mm and preferably about 2 mm.

7. Belt according to claim 5, wherein the cables comprising at least one set of said sub-layers are staggered between said sub-layers.

* * * * *